(12) United States Patent
Patwa (10) Patent No.: US 12,442,714 B2
(45) Date of Patent: Oct. 14, 2025

(54) DOWNHOLE LEAK DETECTION IN A HYDRAULIC SYSTEM

(71) Applicant: Halliburton Energy Services, Inc., Houston, TX (US)

(72) Inventor: Ruchir Shirish Patwa, Sugar Land, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 214 days.

(21) Appl. No.: 18/200,079

(22) Filed: May 22, 2023

(65) Prior Publication Data

US 2024/0393205 A1 Nov. 28, 2024

(51) Int. Cl.
*G01M 3/40* (2006.01)
*E21B 47/117* (2012.01)
*E21B 34/06* (2006.01)
*E21B 34/08* (2006.01)

(52) U.S. Cl.
CPC ............ *G01M 3/40* (2013.01); *E21B 47/117* (2020.05); *E21B 34/066* (2013.01); *E21B 34/08* (2013.01)

(58) Field of Classification Search
CPC ........ G01M 3/40; E21B 47/117; E21B 34/08; E21B 34/066
See application file for complete search history.

(56) References Cited

U.S. PATENT DOCUMENTS

| | | | |
|---|---|---|---|
| 7,779,684 B2 | 8/2010 | Meek et al. | |
| 2020/0291767 A1* | 9/2020 | Kroslid | G06F 17/18 |
| 2021/0277763 A1* | 9/2021 | Zheng | E21B 44/00 |
| 2021/0301642 A1* | 9/2021 | Wicks | E21B 4/02 |

\* cited by examiner

*Primary Examiner* — Eman A Alkafawi
*Assistant Examiner* — Suresh K Rajaputra
(74) *Attorney, Agent, or Firm* — NOVAK DRUCE CARROLL LLP (57) ABSTRACT

Systems and methods are provided for detecting leaks in a hydraulic system. An example method can include retrieving from memory, current signatures for a plurality of components in a hydraulic system; monitoring current consumption of a hydraulic motor during operation of the motor; determining, based on a comparison of the current consumption and current signature of the motor, an abnormal operating condition of the motor; collecting, based on the determination of the abnormal condition of the motor, current consumption data from the remaining components of the plurality of components; comparing the collected current consumption data to the current signatures corresponding to each of the remaining components of the plurality of components; and identifying, based on the comparison of the collected current data and current signatures, an abnormal operating condition for at least one of the remaining components of the plurality of components.

20 Claims, 8 Drawing Sheets

DOWNHOLE LEAK DETECTION IN A HYDRAULIC SYSTEM

TECHNICAL FIELD

The present technology relates generally to leak detection in a hydraulic system and, more specifically, to a method and system to detect a leak by monitoring current consumption of electrical components of the hydraulic system.

BACKGROUND

Hydraulic systems are widely used in drilling operations for recovering gas and petroleum, as they provide an efficient and reliable means of transmitting power and controlling the movement of equipment. The efficient functioning of these systems is critical for the safe and reliable operation of the machinery they power. However, leaks in hydraulic systems can lead to reduced system performance, increased maintenance costs, and potential safety hazards. Detecting leaks in hydraulic systems can be challenging due to the complexity of these systems and the limited visibility of hydraulic components. Furthermore, the high pressure and high temperatures involved in hydraulic systems make it difficult to identify and locate leaks accurately. Consequently, there is a need for effective and efficient leak detection methods to prevent potential problems in hydraulic systems.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Disclosed are systems and methods for detecting a hydraulic leak in a hydraulic system by monitor the current consumption of components within the system. Current consumed by a hydraulic component will vary depending on its operating conditions. When a component is functioning correctly, it will consume a normal amount of current as it actuates and operates within the hydraulic system. However, when there is a leak in the system, the current consumption of the affected component will be reduced as the leaking hydraulic fluid causes a loss of pressure and a decrease in the load that the component must handle.

By monitoring the current consumption of each hydraulic component, abnormal current consumption can be detected and tracked. This approach can provide a clear indication of which components are operating outside of their expected parameters and could therefore be indicative of a leaking hydraulic component. For example, if the current consumption of a hydraulic solenoid is significantly lower than normal, this could be an indication of a leak in the hydraulic system. By analyzing the data gathered from monitoring the current consumption of components, the location of the leak can be determined with greater accuracy, allowing maintenance teams to quickly pinpoint the source of the issue and take appropriate action.

An advantage of using current consumption monitoring to identify hydraulic leaks is that it is a non-invasive method.

Unlike other leak detection techniques, such as dye injection or ultrasonic testing, there is no need to shut down the hydraulic system or disassemble components in order to carry out the inspection. This approach can save significant time and resources, particularly in situations where hydraulic systems are located in difficult-to-access locations, or where shutdowns would cause significant disruption to ongoing operations.

Monitoring current consumption of components in hydraulic systems provides an effective solution for identifying hydraulic leaks. By tracking and analyzing the current consumption of each component, abnormal current consumption can be detected and tracked, which could be indicative of a leaking hydraulic component. This approach is non-invasive, allowing inspections to be carried out quickly and with minimal disruption to operations. By detecting and addressing hydraulic leaks promptly, maintenance teams can prevent safety hazards, environmental damage, and financial losses associated with hydraulic leaks.

According to at least one example, a method for detecting leaks in a hydraulic system is provided. The method can include retrieving from memory, current signatures for a plurality of components in a hydraulic system, the current signatures indicative of a normal operating condition for each component of the plurality of components, wherein the plurality of components includes a motor configured to power a pump that is configured to pressurize the hydraulic system; monitoring current consumption of the motor during operation of the motor; determining, based on a comparison of the current consumption and current signature of the motor, an abnormal operating condition of the motor; collecting, based on the determination of the abnormal condition of the motor, current consumption data from the remaining components of the plurality of components; comparing the collected current consumption data to the current signatures corresponding to each of the remaining components of the plurality of components; and identifying, based on the comparison of the collected current data and current signatures, an abnormal operating condition for at least one of the remaining components of the plurality of components.

In another example, a system for detecting leaks in a hydraulic system is provided. The system can include one or more processors and at least one computer-readable storage medium having stored therein instructions which, when executed by the one or more processors, cause the system to retrieve from memory, current signatures for a plurality of components in a hydraulic system, the current signatures indicative of a normal operating condition for each component of the plurality of components, wherein the plurality of components includes a motor configured to power a pump that is configured to pressurize the hydraulic system; monitor current consumption of the motor during operation of the motor; determine, based on a comparison of the current consumption and current signature of the motor, an abnormal operating condition of the motor; collect, based on the determination of the abnormal condition of the motor, current consumption data from the remaining components of the plurality of components; compare the collected current consumption data to the current signatures corresponding to each of the remaining components of the plurality of components; and identify, based on the comparison of the collected current data and current signatures, an abnormal operating condition for at least one of the remaining components of the plurality of components.

In another example, a non-transitory computer-readable storage medium for detecting leaks in a hydraulic system is provided. The non-transitory computer-readable storage medium can include instructions which, when executed by one or more processors, cause the one or more processors to retrieve from memory, current signatures for a plurality of components in a hydraulic system, the current signatures indicative of a normal operating condition for each component of the plurality of components, wherein the plurality of components includes a motor configured to power a pump that is configured to pressurize the hydraulic system; monitor current consumption of the motor during operation of the motor; determine, based on a comparison of the current consumption and current signature of the motor, an abnormal operating condition of the motor; collect, based on the determination of the abnormal condition of the motor, current consumption data from the remaining components of the plurality of components; compare the collected current consumption data to the current signatures corresponding to each of the remaining components of the plurality of components; and identify, based on the comparison of the collected current data and current signatures, an abnormal operating condition for at least one of the remaining components of the plurality of components.

Figure 6:
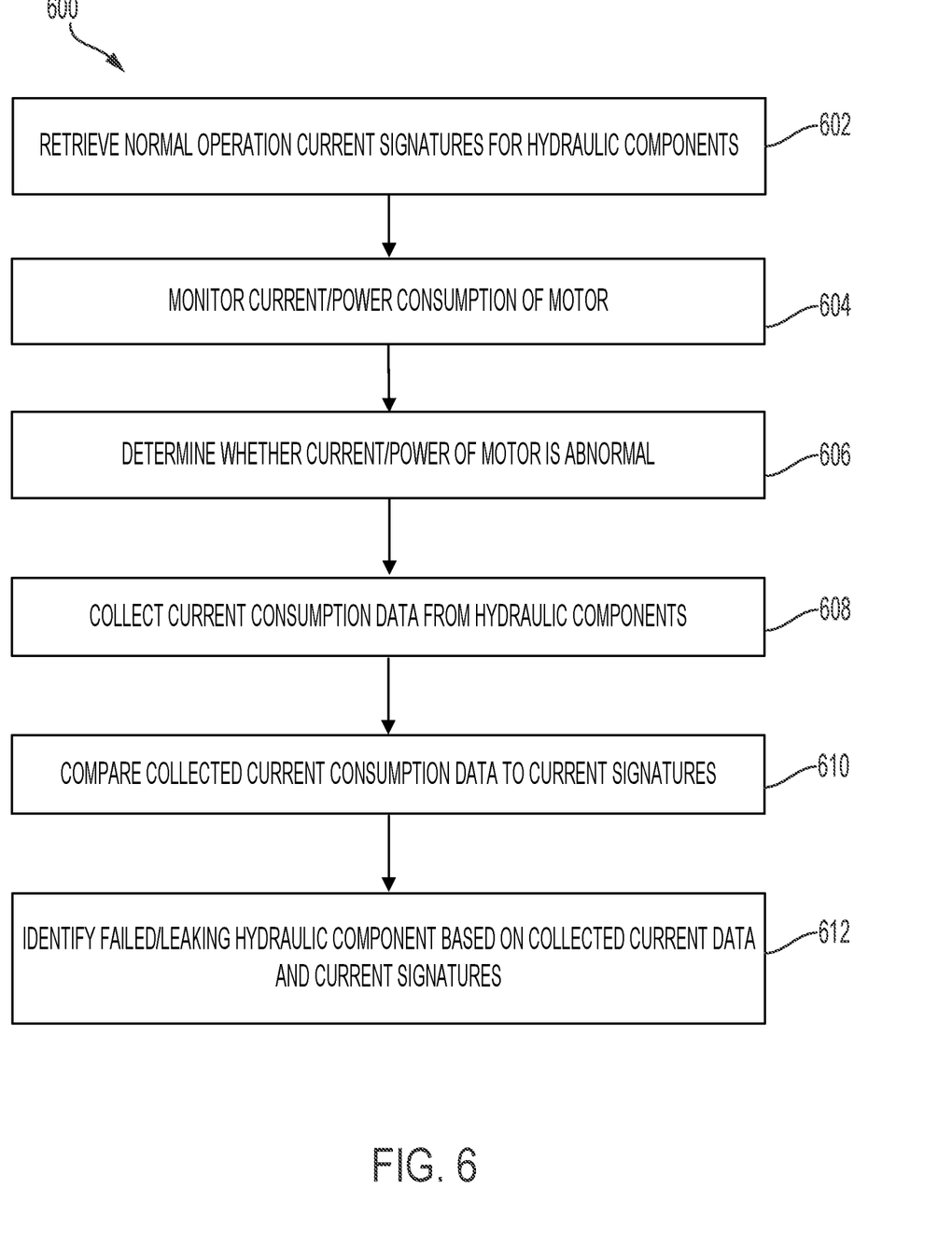
FIG. 6 is a flowchart of an example method for detecting a leak in a hydraulic system in a drilling system, in accordance with some examples.
Figure 7:
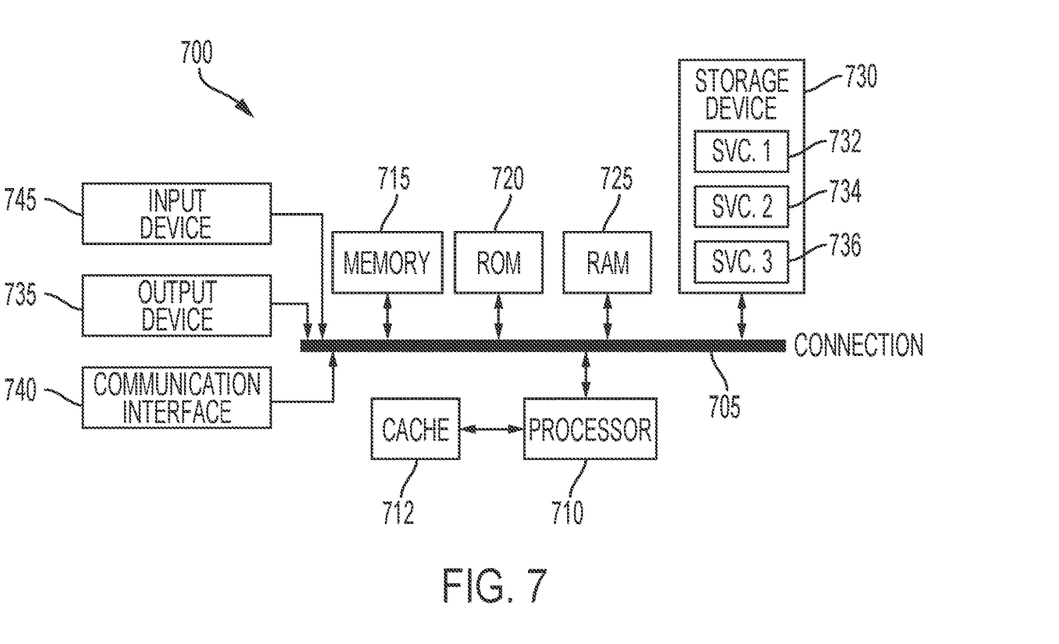
FIG. 7 is a schematic diagram of an example computing device architecture, in accordance with some examples.

As follows, the disclosure will provide a more detailed description of the systems, methods, computer-readable media and techniques herein for detecting a leak in a hydraulic system. The disclosure will begin with a description of example systems and environments, as shown in FIGS. 1A through 2 and 5, and a discussion of example current consumption graphs representing normal and abnormal current consumption, as shown in FIGS. 3A through 4B. A description of an example method for detecting a leak in a hydraulic system, as shown in FIG. 6, will then follow. The disclosure concludes with a description of an example computing system architecture, as shown in FIG. 7, which can be implemented for performing computing operations and functions disclosed herein. These variations shall be described herein as the various embodiments are set forth.

Figure 1A:
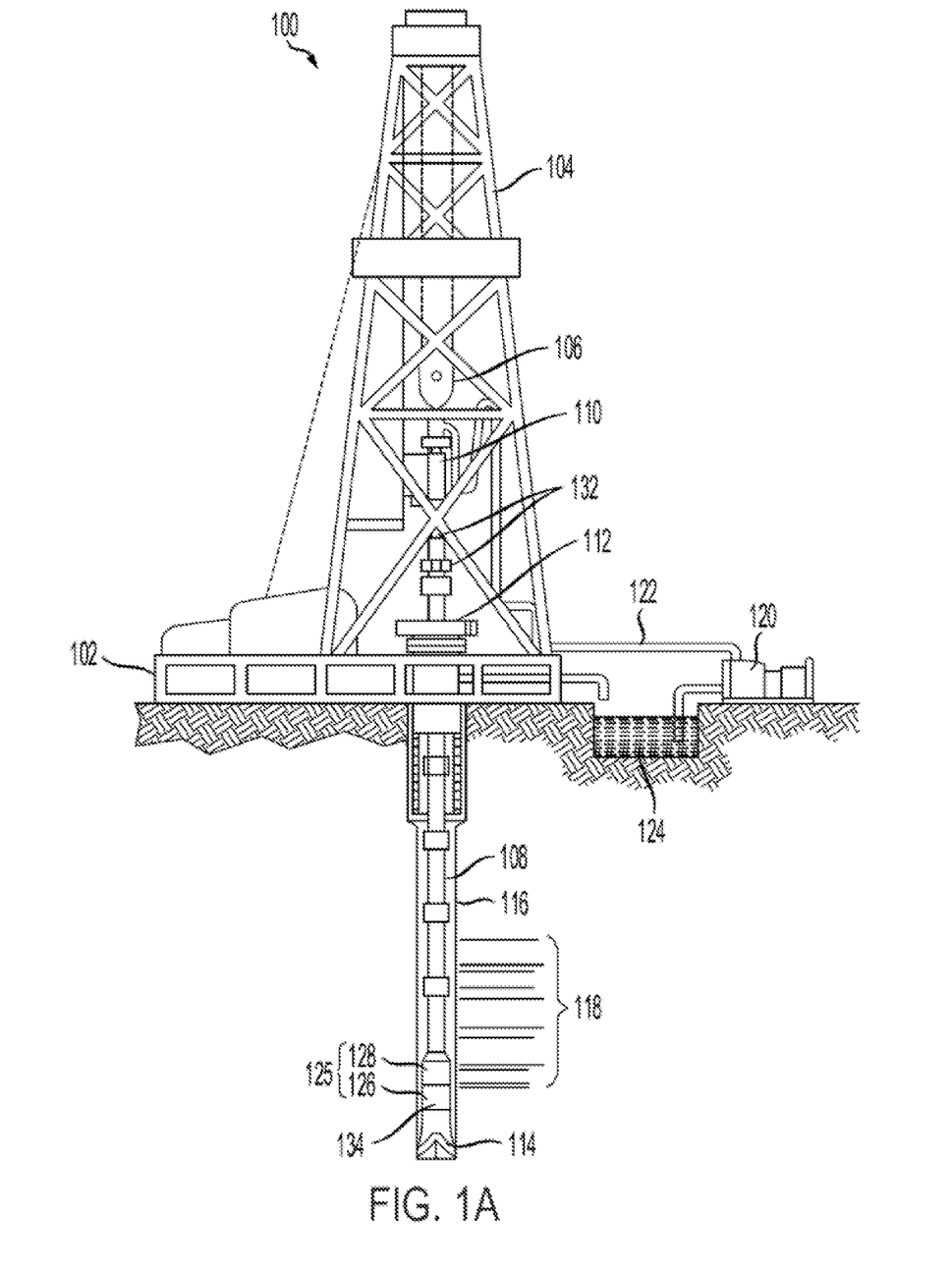
FIG. 1A is a schematic diagram of an example logging while drilling (LWD) wellbore operating environment, in accordance with some examples.

The disclosure now turns to FIG. 1A, which illustrates a schematic view of a logging while drilling (LWD) wellbore operating environment 100 in in accordance with some examples of the present disclosure. As depicted in FIG. 1A, a drilling platform 102 can be equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, the drill bit 114 creates a wellbore 116 that passes through various formations 118. A pump 120 circulates drilling fluid through a supply pipe 122 to top drive 110, down through the interior of drill string 108 and orifices in drill bit 114, back to the surface via the annulus around drill string 108, and into a retention pit 124. The drilling fluid transports cuttings from the wellbore 116 into the retention pit 124 and aids in maintaining the integrity of the wellbore 116. Various materials can be used for drilling fluid, including oil-based fluids and water-based fluids.

Logging tools 126 can be integrated into the bottom-hole assembly 125 near the drill bit 114. As the drill bit 114 extends the wellbore 116 through the formations 118, logging tools 126 collect measurements relating to various formation properties as well as the orientation of the tool and various other drilling conditions. The bottom-hole assembly 125 may also include a telemetry sub 128 to transfer measurement data to a surface receiver 132 and to receive commands from the surface. In at least some cases, the telemetry sub 128 communicates with a surface receiver 132 using mud pulse telemetry. In some instances, the telemetry sub 128 does not communicate with the surface, but rather stores logging data for later retrieval at the surface when the logging assembly is recovered.

Each of the logging tools 126 may include one or more tool components spaced apart from each other and communicatively coupled with one or more wires and/or other media. The logging tools 126 may also include one or more computing devices 134 communicatively coupled with one or more of the one or more tool components by one or more wires and/or other media. The one or more computing devices 134 may be configured to control or monitor a performance of the tool, process logging data, and/or carry out one or more aspects of the methods and processes of the present disclosure.

In at least some instances, one or more of the logging tools 126 may communicate with a surface receiver 132 by a wire, such as wired drillpipe. In other cases, the one or more of the logging tools 126 may communicate with a surface receiver 132 by wireless signal transmission. In at least some cases, one or more of the logging tools 126 may receive electrical power from a wire that extends to the surface, including wires extending through a wired drillpipe.

Figure 1B:
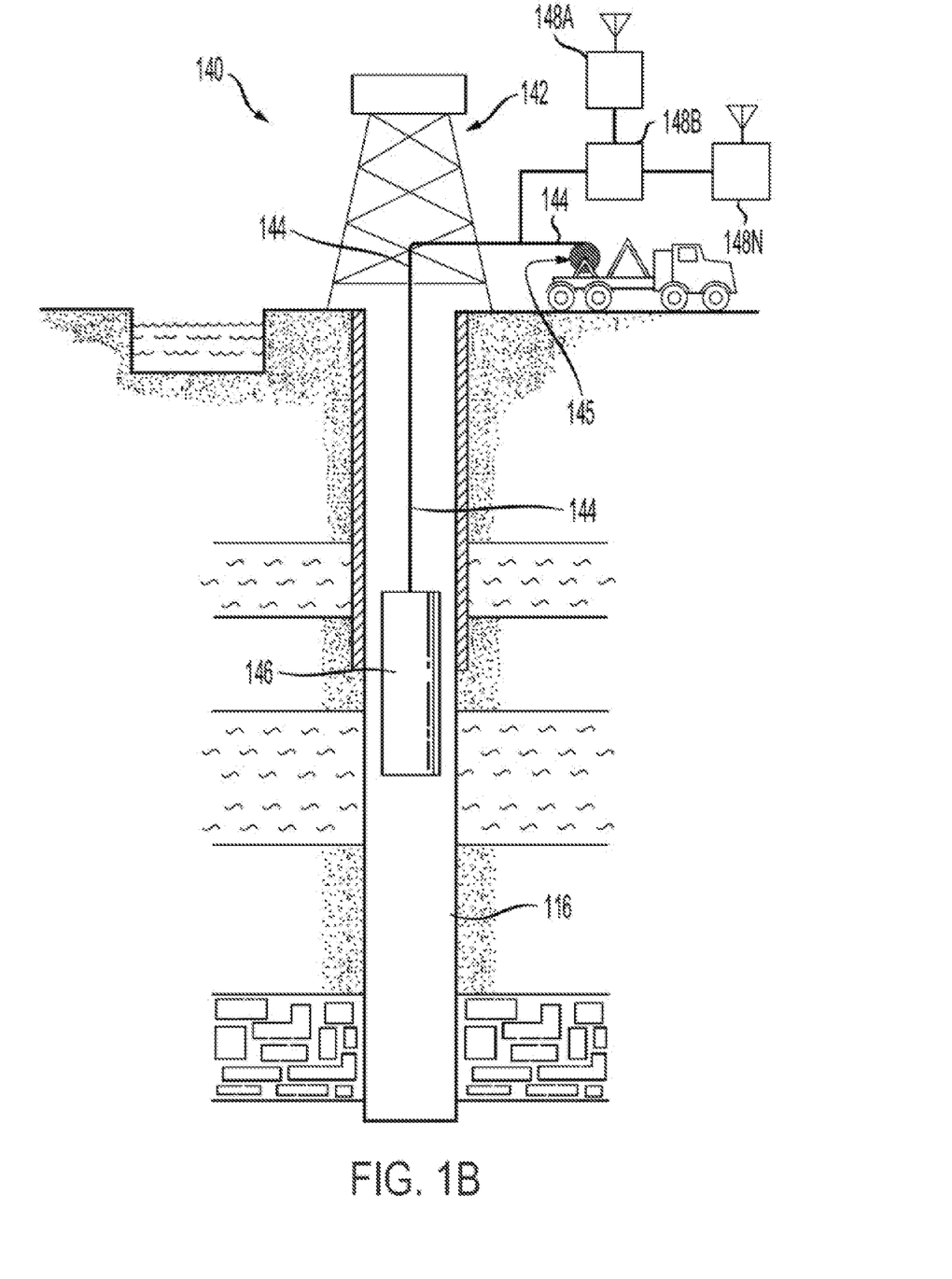
FIG. 1B is a schematic diagram of an example downhole environment having tubulars, in accordance with some examples.

Referring to FIG. 1B, an example system 140 for downhole line detection in a downhole environment having tubulars can employ a tool having a tool body 146 in order to carry out logging and/or other operations. For example, instead of using the drill string 108 of FIG. 1A to lower tool body 146, which may contain sensors or other instrumentation for detecting and logging nearby characteristics and conditions of the wellbore 116 and surrounding formation, a wireline conveyance 144 can be used. The tool body 146 can include a resistivity logging tool. The tool body 146 can be lowered into the wellbore 116 by wireline conveyance 144. The wireline conveyance 144 can be anchored in the drill rig 145 or a portable means such as a truck. The wireline conveyance 144 can include one or more wires, slicklines, cables, and/or the like, as well as tubular conveyances such as coiled tubing, joint tubing, or other tubulars.

The illustrated wireline conveyance 144 provides support for the tool, as well as enabling communication between tool processors 148A-N on the surface and providing a power supply. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more processors 148A-N, which can include local and/or remote processors. Moreover, power can be supplied via the wireline conveyance 144 to meet power requirements of the tool. For slickline or coiled tubing configurations, power can be supplied downhole with a battery or via a downhole generator.

Figure 2:
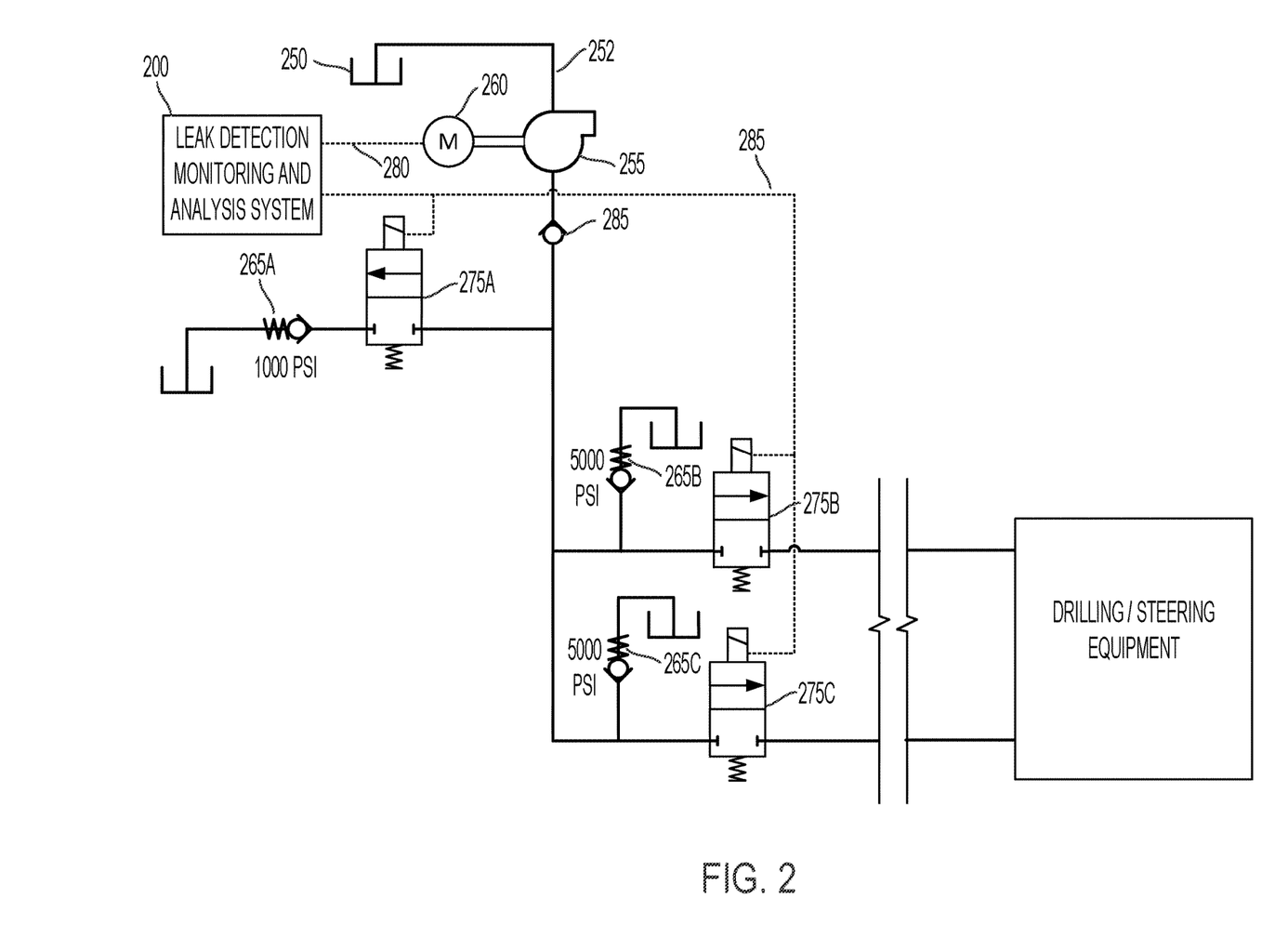
FIG. 2 is a block diagram of an example hydraulic leak detection system which can be implemented to identify components within a hydraulic system that are failing, in accordance with some examples.

FIG. 2 is a block diagram of an example hydraulic leak detection system 200 which can be implemented to identify components within a hydraulic system that are failing, in accordance with some examples. The hydraulic system includes a reservoir 250 containing hydraulic fluid for controlling or actuating drilling or steering equipment for use in wellbore operations. Hydraulic fluid flows within hydraulic lines 252, with the hydraulic lines 252 pressurized via the use of a pump 255 that is coupled to a motor 260. The hydraulic system utilizes pressure relief valves 265A-C, solenoid valves 275A-C, and check valve 285 to activate certain regions or circuits of the hydraulic system and to control pressures therein. The solenoid valves 275A-C may be "normally closed" valves that are actuated or opened upon application of electrical current. The check valves and relief valves may be mechanical components that rely on a spring of other mechanism to control or relieve system pressure.

Motor 260 drives pump 255 to pressurize the hydraulic system and to adjust pressures therein, as needed to control the drilling and steering equipment. Check valve 285 prevents back flow of the hydraulic fluid and ensures that fluid flows in a single direction. Solenoid valve 275A, upon actuation, causes hydraulic fluid to flow therethrough to pressurize the line containing the pressure relief valve 265A. Pressure relief valve 265A has a pressure rating of 1000 PSI thereby enabling the release of hydraulic fluid in the event the pressure of line 252 exceeds 1000 PSI. Pressure relief valves 265C-D each have a pressure rating of 5000 PSI thereby enabling the release of hydraulic fluid in the event the pressure of line 252 exceeds 5000 PSI. Solenoid valves 275B-C, upon actuation, causes hydraulic fluid to flow therethrough to pressurize their corresponding lines.

The hydraulic system includes leak detection monitoring and analysis system 200 to monitor current or power consumption of hydraulic components for identification of failing or leaking components. Every electronically-controlled hydraulic component of the hydraulic system utilizes a current sensor that is configured to capture current consumption data. By employing current sensors, variations in current flow can be observed, providing valuable insights into the integrity of the system. When a hydraulic component is functioning properly, the current flowing through it remains relatively stable. However, if there is a leak in the component, the hydraulic fluid may escape, leading to a reduction in the current flow. By monitoring the current, any anomalies or fluctuations can be detected, indicating the presence of a potential leak. This non-invasive approach allows for proactive maintenance, enabling timely repairs or replacements to mitigate any further damage and ensure the overall efficiency and safety of the hydraulic system. The current consumption data is transmitted to the leak detection monitoring and analysis system 200 via communication pathway 280 and 285, which may be a wired or wireless connection, for analysis as discussed further below.

Figure 3A:
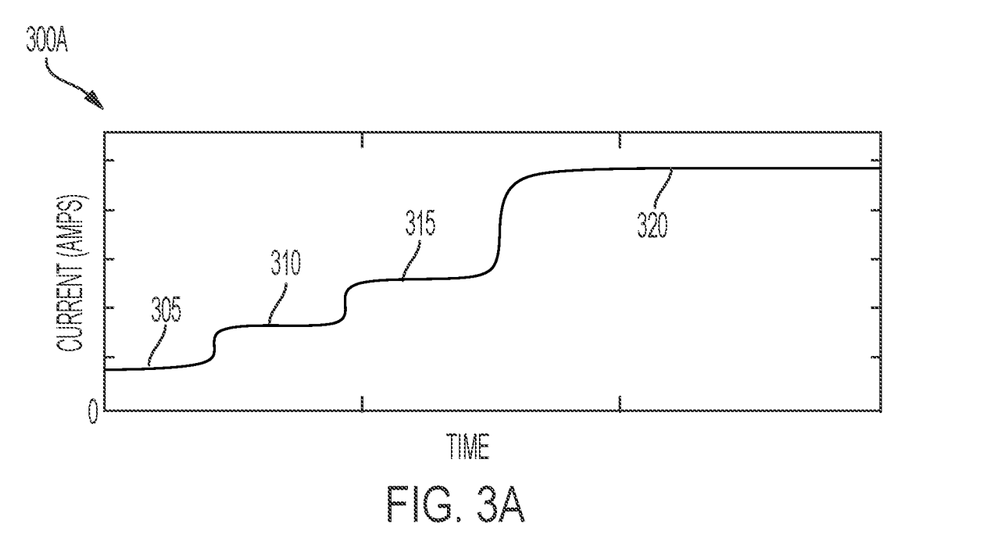
FIG. 3A is a graph showing current consumption as a function of time detected from a motor coupled to a pump.

The leak detection monitoring and analysis system 200 compares current or power consumption data to current or power signatures to identify abnormalities during operation. Referring to FIG. 3A, a current signature 300A as a function of time is illustrated for the motor 260 coupled to pump 255. The current signature 300A represents current draw or consumption for the motor 260 during normal operation as the pump increases the pressure in the hydraulic system from a starting pressure to 1000 PSI, 2000 PSI, and 5000 PSI. Each pressure threshold consumes a certain amount of current as illustrated in FIG. 3A. For example, at a starting pressure, the motor 260 draws a first current 305. As the system is pressurized to 1000 PSI, the current drawn increases to a second current 310. As the system is pressurized to 2000 PSI, the current drawn increases to a third current 315. And finally, as the system is pressurized to 5000 PSI, the current drawn increases to a fourth current 320.

Figure 3B:
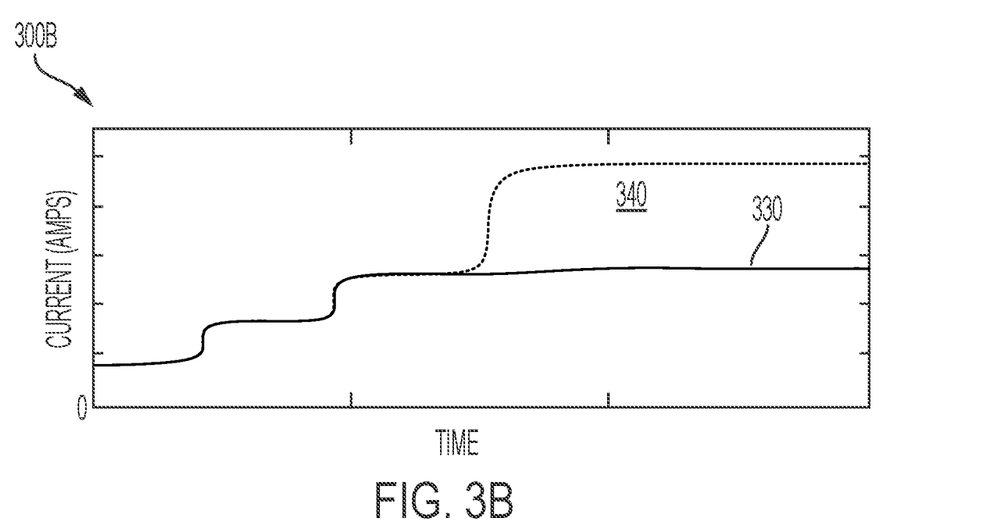
FIG. 3B is a graph showing current consumption as a function of time detected from a motor coupled to a pump indicating an abnormal condition.

FIG. 3B illustrates current consumption 300B as a function of time detected from the motor 260 indicating an abnormal condition. Current consumption 300B represents current consumption data captured by a current sensor of the motor 260 that is communicated via pathway 280 to the leak detection monitoring and analysis system 200. The leak detection monitoring and analysis system 200 compares the current consumption 300B to the current signature 300A for the motor 260 and identifies a discrepancy 340 in the current 330 consumed by the motor 260 as the motor drives the pump to pressurize the system to 5000 PSI. As shown, the motor is expected to draw more current but instead, is shown as drawing less current than expected, as depicted by discrepancy 340. The reduced current draw indicates that the system is unable to reach a pressure of 5000 PSI, thereby indicating a failed or leaking hydraulic component downstream.

Figure 4A:
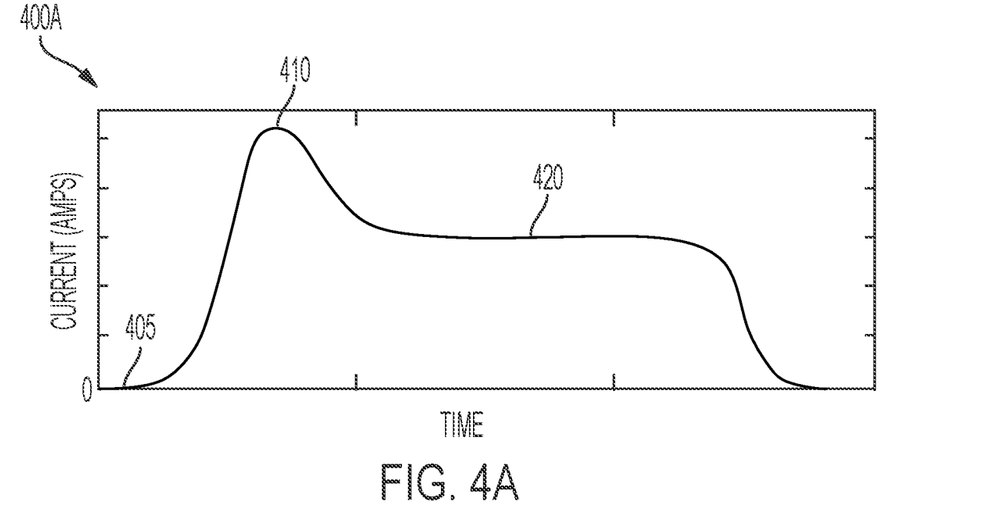
FIG. 4A is a graph showing current consumption as a function of time detected from a hydraulic component in the hydraulic system.

FIG. 4A illustrates a current signature 400A as a function of time detected from an electronically-controlled component of the hydraulic system. The current signature 400A represents current draw or consumption for solenoid valves 275A-C during normal operation as the solenoid valve is actuated or opened. As shown, prior to actuation, there is no current 405 provided to the solenoid valve 275A-C. Upon application of current, there is a current peak 410 consumed as the solenoid is actuated (e.g., opened) and acts upon the pressurized fluid to allow the fluid to flow therethrough. Thereafter, as the solenoid valve remains open, the current is reduced but settles to a stable current draw 420 until current is removed and the solenoid valve returns to a closed position.

Figure 4B:
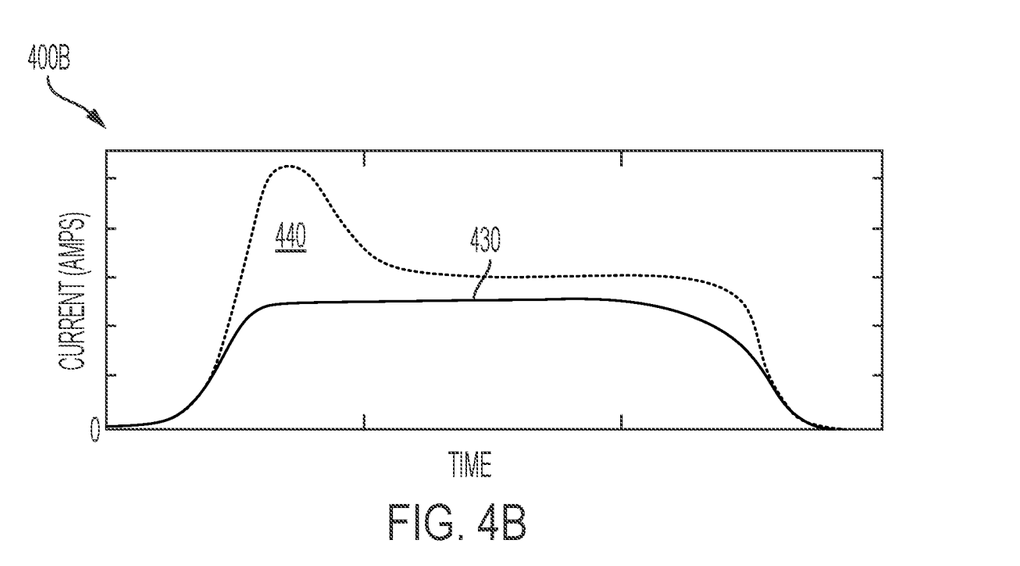
FIG. 4B is a graph showing current consumption as a function of time detected from a hydraulic component in the hydraulic system indicating an abnormal condition.

FIG. 4B illustrates current consumption 400B as a function of time detected from an electronically-controlled component indicating an abnormal operating condition. The current 430 required to actuate or open the solenoid valve is reduced thereby resulting in a discrepancy 440. Discrepancy 440 is indicative of a failing or leaking solenoid valve.

Referring back to FIG. 2, if solenoid valve 275A is closed (e.g., not actuated) and the leak detection monitoring and analysis system 200 detects discrepancy 340 from current consumption 330 of the motor upon attempting to pressurize the system to 5000 PSI, the leak detection monitoring and analysis system 200 may begin monitoring current consumption for solenoid valves 275B-C via pathway 285 as they are each individually actuated. The leak detection monitoring and analysis system 200 compares their respective current consumptions to their current signatures. If the leak detection monitoring and analysis system 200 detects a discrepancy 440 for a particular solenoid valve 275B-C, then the leak detection monitoring and analysis system 200 identifies that solenoid valve as failing or leaking thereby requiring maintenance or replacement. Alternatively, if the leak detection monitoring and analysis system 200 does not detect a discrepancy for the solenoid valves 275B-C, then the leak detection monitoring and analysis system 200 identifies the failing or leaking components as the pressure relief valves 265B-C due to their presence in the affected region of the hydraulic system. If pressure relief valve 265B is leaking, or in other words failing to properly close, then the system is unable to pressurize to the required 5000 PSI as the leaking pressure relief valve 265B allows hydraulic fluid to flow past the relief valve 265B. In this manner, the leak detection monitoring and analysis system 200 is able to isolate regions of the hydraulic line 252 as having the leak and thereafter, may identify one or more leaking components.

By way of another example, if solenoid valves 275A-C are closed and the system is unable to obtain a pressure higher than 1000 PSI, this may signify that solenoid valve 275A is leaking because the system is unable to pressurize beyond the limit of pressure relief valve 265A. The leak detection monitoring and analysis system 200 may monitor current consumption of solenoid valve 275A to confirm whether a discrepancy 440 is detected. Once confirmed, the solenoid valve 275A may be identified as the failing or leaking component. As yet another example, if solenoid valve 275A is open but solenoid valves 275B-C are closed and the system is unable to achieve a pressure of 1000 PSI, the leak detection monitoring and analysis system 200 may determine that the pressure relief valve 265A is failing as the system is unable to pressurize to the 1000 PSI threshold for the pressure relief valve. As described, by monitoring current consumption of the motor to identify discrepancies, leak detection analysis of components downstream may be performed by monitoring current consumption of electronically controlled components as well as performance parameters of mechanical components.

Figure 5:
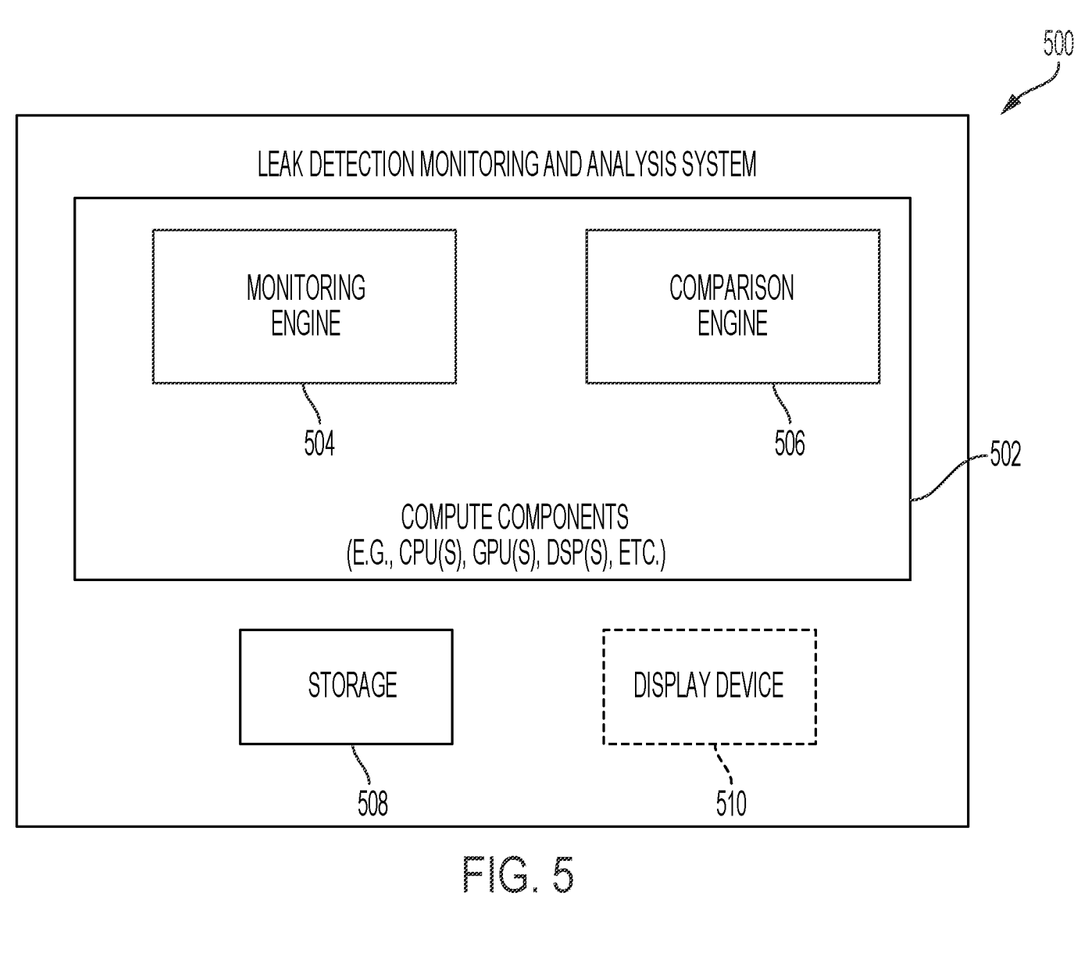
FIG. 5 is a block diagram of an example leak detection monitoring and analysis system which can be implemented to detect and identify a leaking component of a hydraulic system, in accordance with some examples.

FIG. 5 is a block diagram of an example leak detection monitoring and analysis system 500 which can be implemented to detect and identify a leaking component of a hydraulic system, in accordance with some examples. The leak detection monitoring and analysis system 500 can be implemented for identifying a leaking or failing hydraulic component within the hydraulic system as described herein. In this example, the leak detection monitoring and analysis system 500 can include compute components 502, a monitoring engine 504, a comparison engine 506, and a storage 508. In some implementations, the leak detection monitoring and analysis system 500 can also include a display device 510 for displaying data and graphical elements such as images, videos, text, simulations, and any other media or data content.

The leak detection monitoring and analysis system 500 can be part of, or implemented by, one or more computing devices, such as one or more servers, one or more personal computers, one or more processors, one or more mobile devices (e.g., a smartphone, a camera, a laptop computer, a tablet computer, a smart device, etc.), and/or any other suitable electronic device. In some cases, the one or more computing devices that include or implement the leak detection monitoring and analysis system 500 can include one or more hardware components such as, for example, one or more wireless transceivers, one or more input devices, one or more output devices (e.g., display device 510), one or more sensors (e.g., a current sensor, a temperature sensor, a pressure sensor, etc.), one or more storage devices (e.g., storage system 508), one or more processing devices (e.g., compute components 502), etc.

As previously mentioned, the leak detection monitoring and analysis system 500 can include compute components 502. The compute components 502 can be used to implement the monitoring engine 504, the comparison engine 506, and/or any other computing component. The compute components 502 can also be used to control, communicate with, and/or interact with the storage 508 and/or the display device 510. The compute components 502 can include electronic circuits and/or other electronic hardware, such as, for example and without limitation, one or more programmable electronic circuits. For example, the compute components 502 can include one or more microprocessors, one or more graphics processing units (GPUs), one or more digital signal processors (DSPs), one or more central processing units (CPUs), one or more image signal processors (ISPs), and/or any other suitable electronic circuits and/or hardware. Moreover, the compute components 502 can include and/or can be implemented using computer software, firmware, or any combination thereof, to perform the various operations described herein.

The monitoring engine 504 can be used to receive and monitor data. For example, the monitoring engine 504 can be used to receive current or power consumption data from electronically controlled hydraulic components of a hydraulic system. In some cases, the monitoring engine 504 can be used to monitor current or power consumption of the hydraulic pump motor. The monitoring engine 504 may continuously receive current or power consumption data and upon a change in operating parameters for the motor, be configured to transmit current or power consumption data during the operational change to the comparison engine 506 for analysis. Operating parameters may include RPM, torque, or other parameters that may be associated with increasing a pressure of the hydraulic system.

As another example, the monitoring engine 504 may continuously monitor current consumption of the hydraulic components (e.g., solenoid valves) and in response to an indication from the comparison engine 506 that the motor is in an abnormal operating condition, cause the current consumption data from the hydraulic components to be sent to the comparison engine 506 for analysis. Alternatively, the monitoring engine 504 may be configured to query the hydraulic components and in response to the query, the monitoring engine 504 may be configured to receive the current consumption data from the hydraulic components. In one aspect, the queries may be individually addressable to each hydraulic component and in response to receiving the corresponding query, the current sensor associated with each hydraulic component may be configured to transmit current consumption data to the monitoring engine 504. In some aspects, the monitoring engine 504 may transmit the queries in response to an indication from the comparison engine 506 of an abnormal operating condition for the hydraulic pump motor. Upon receipt of the current consumption data from the hydraulic components, the monitoring engine 504 may transmit the current consumption data to the comparison engine 506 for analysis, as discussed further below.

The monitoring engine 504 can also process and format current or power consumption data for use by the comparison engine 506 prior to sending the data to the comparison engine 506. For example, the current or power consumption data received from the hydraulic components may be processed to correspond with a collection frequency of the current or power signature of the corresponding hydraulic component.

Once processed, the current or power consumption data may be transmitted to the comparison engine 506 for analysis.

The comparison engine 506 analyzes current or power consumption data received from the monitoring engine 504 by comparing the current or power consumption data to current or power signatures corresponding to the appropriate hydraulic component. Specifically, the comparison engine 506 may be configured to analyze current or power consumption data associated with the hydraulic pump motor to identify an abnormal operating condition, as shown by discrepancy 340 in FIG. 3B.

Upon identification of an abnormal operating condition for the hydraulic pump motor, the comparison engine 506 may inform the monitoring engine 504 of the abnormality and in response, the monitoring engine 504 may transmit current consumption data of the other hydraulic components to the comparison engine 506 for analysis. Alternatively, upon identification of an abnormal operating condition for the hydraulic pump motor, the comparison engine 506 may inform the monitoring engine 504 of the abnormality and in response, the monitoring engine 504 may query the other electronically-controlled hydraulic components to collect their current consumption data and transmit the collected current consumption data to the comparison engine 506 for analysis. The comparison engine 506 analyzes the current consumption data associated with the hydraulic components to identify a failing or leaking hydraulic component, as shown by discrepancy 440 in FIG. 4B.

The comparison engine 506 may also generate and/or provide a graphical user interface (GUI) for receiving input data from a user and/or presenting data generated by the leak detection monitoring and analysis system 500. In some examples, the comparison engine 506 can render data for presentation at the display device 510 and/or another display. The data rendered can include, for example, a depiction of the current discrepancies identified by the comparison engine 506, identification of an abnormal operating condition, and/or identification of a failing or leaking component in the form of notifications, charts, tables, logs, lists, diagrams, reports, graphs, models or simulations, graphics, and/or any other data or content, such as video content, audio content, image content, text, file content, etc.

As previously noted, the comparison engine 506 can provide, display and/or render a GUI (and its associated content and interface elements) and/or content on the display device 510. In some cases, the display device 510 can be part of or implemented by the leak detection monitoring and analysis system 500. Here, the comparison engine 506 can generate a GUI and/or rendered content, and provide the GUI and/or rendered content for presentation on the display device 510. In other cases, the display device 510 can be separate from the leak detection monitoring and analysis system 500. For example, the display device 510 can be a separate and/or remote display. In this example, the leak detection monitoring and analysis system 500 can send or provide a GUI and/or content generated by the comparison engine 506 (and/or the monitoring 504) to the display device 510 and/or a computing device implementing the display device 510, for presentation at the display device 510.

The storage 508 can be any storage device(s) for storing data. In some examples, the storage 508 can include a buffer or cache for storing data for processing by the computer components 502. Moreover, the storage 508 can store data from any of the components of the leak detection monitoring and analysis system 500. For example, the storage 508 can store input data used by the leak detection monitoring and analysis system 500, outputs or results generated by the modeling and analysis system 500 (e.g., data and/or calculations from the monitoring engine 504, the comparison engine 506, etc.), user preferences, parameters and configurations, data logs, documents, software, media items, GUI content, and/or any other data and content.

While the leak detection monitoring and analysis system 500 is shown in FIG. 5 to include certain components, one of ordinary skill in the art will appreciate that the leak detection monitoring and analysis system 500 can include more or fewer components than those shown in FIG. 5. For example, the leak detection monitoring and analysis system 500 can also include one or more memory components (e.g., one or more RAMs, ROMs, caches, buffers, and/or the like), one or more input components, one or more output components, one or more processing devices, and/or one or more hardware components that are not shown in FIG. 5.

FIG. 6 is a flowchart of an example method 600 for detecting a leak in a hydraulic system in a drilling system, in accordance with some examples. The steps outlined herein are exemplary and can be implemented in any combination thereof, including combinations that exclude, add, or modify certain steps.

Current can be utilized to detect potential leaks in hydraulic components. Through the use of current sensors, variations in current flow can be monitored, providing valuable insights into the integrity of the hydraulic system. When a hydraulic component is functioning properly, the current flowing through it remains relatively stable. When a hydraulic component is actuated, such as a solenoid vale, it is expected to momentarily draw an increase in current as the hydraulic component acts upon a pressurized system. The current drawn by the hydraulic component may be characterized over time as a current signature. If there is a leak in the component, the hydraulic fluid may escape, leading to a change in the current flow that deviates from the expected current signature for the hydraulic component. As such, by monitoring the current, any anomalies or fluctuations can be detected, indicating the presence of a potential leak. This non-invasive approach allows for proactive maintenance, enabling timely repairs or replacements to mitigate any further damage and ensure the overall efficiency and safety of the hydraulic system.

Current signatures for electronically-controlled hydraulic components of a hydraulic system may be generated, captured and stored in memory. The current signatures represent current consumption during normal operation of the hydraulic components at one or more pressures of the hydraulic system. For motors coupled to pumps of the hydraulic system, current or power signatures may be used document normal operating conditions. In either instance, the current or power signatures of the motor represent time-based current or power consumption data reflecting current or power consumed while operating the motor at one pressure or multiple pressures, as well as during a transition from a lower pressure to a higher pressure. In another aspect, the current or power signatures of the motor may represent time-based current or power consumption data reflecting current or power consumed while sequentially increasing a pressure of the hydraulic system to three or more different pressures. For other electronically-controlled hydraulic components, the current signatures may represent time-based current consumption data reflecting current consumed while actuating the hydraulic component at a particular pressure.

At step 602, the leak detection monitoring and analysis system 200, 500 can retrieve from memory, current signatures for the hydraulic components utilized in the hydraulic system. For example, the leak detection monitoring and analysis system 200, 500 may retrieve current or power signatures for a motor used to power a pump that is configured to pressurize the hydraulic system, as well the current signatures of the solenoid valves used in the hydraulic system.

At step 604, the leak detection monitoring and analysis system 200, 500 monitors current or power consumption of the motor during operation of the motor. A current sensor coupled to the motor sends current consumption data to the leak detection monitoring and analysis system 200, 500 in real-time for monitoring.

At step 606, the leak detection monitoring and analysis system 200, 500 determines, based on a comparison of the current or power consumption and current or power signature of the motor, an abnormal operating condition of the motor. For example, upon an expected increase of pressure for the hydraulic system, the motor may be expected to draw more current. If the current drawn is reduced when compared to the current or power signature, a leak in the hydraulic system may be present.

At step 608, upon an indication that the motor is operating in an abnormal condition due to a reduced current draw, the leak detection monitoring and analysis system 200, 500 collects current consumption data from the other electronically-controlled components of the hydraulic system. The current consumption data may be collected in real-time for comparison to the corresponding current signatures for each electronically-controlled hydraulic component.

At step 610, the leak detection monitoring and analysis system 200, 500 compares the collected current consumption data to the current signatures corresponding to each of the electronically-controlled hydraulic components. For example, if a solenoid valve draws less current than expected during actuation, the pressure surrounding the valve is likely lower than expected thereby indicating that the solenoid valve is leaking or failing.

At step 612, the leak detection monitoring and analysis system 200, 500 identifies, based on the comparison of the collected current data and current signatures, an abnormal operating condition for one or more of the hydraulic components.

In other cases, the leak detection monitoring and analysis system 200, 500 may indicate that the motor is operating in an abnormal condition due to a reduced current draw, but none of the electronically-controlled components indicate a reduced current draw upon activation. In such cases, the leak detection monitoring and analysis system 200, 500 may isolate a region of the hydraulic system to identify failing or leaking mechanical or non-electrical hydraulic components, such as check valves or relief valves. Based on the collected current consumption data and current signatures for the relevant electronically-controlled components, the leak detection monitoring and analysis system 200, 500 may indicate that a particular relief valve adjacent to a particular solenoid valve may be the leaking or failing component due to the relevant portion of the hydraulic system failing to reach adequate pressure. Based on the number of mechanical and non-electrical hydraulic components in the isolated region, the leak detection monitoring and analysis system 200, 500 may identify one or more non-electric components as an abnormally operating component.

FIG. 7 is a schematic diagram of an example computing device architecture 700, which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible. The computing device architecture 700 can implement the leak detection monitoring and analysis system 200, 500 (as shown in FIGS. 2 and 5 respectively), and perform various steps, methods, and techniques disclosed herein, such as one or more steps of the method 600 shown in FIG. 6. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1: A method for detecting leaks in a hydraulic system comprising retrieving from memory, current signatures for a plurality of components in a hydraulic system, the current signatures indicative of a normal operating condition for each component of the plurality of components, wherein the plurality of components includes a motor configured to power a pump that is configured to pressurize the hydraulic system; monitoring current consumption of the motor during operation of the motor; determining, based on a comparison of the current consumption and current signature of the motor, an abnormal operating condition of the motor; collecting, based on the determination of the abnormal condition of the motor, current consumption data from the remaining components of the plurality of components; comparing the collected current consumption data to the current signatures corresponding to each of the remaining components of the plurality of components; and identifying, based on the comparison of the collected current data and current signatures, an abnormal operating condition for at least one of the remaining components of the plurality of components.

Statement 2: A method according to Statement 1, further comprising generating current signatures for the plurality of components in the hydraulic system.

Statement 3: A method according to any of Statements 1 and 2, further comprising isolating a region of the hydraulic system based on the collected current consumption data, the current consumption data indicative of normal operation of the remaining components of the plurality of components.

Statement 4: A method according to any of Statements 1 through 3, further comprising identifying a non-electric component of the hydraulic system based on the isolated region of the hydraulic system, the non-electric component identified as an abnormally operating component.

Statement 5: A method according to any of Statements 1 through 4, wherein the non-electric component comprises at least one of a pressure relief valve and a check valve.

Statement 6: A method according to any of Statements 1 through 5, wherein collecting current consumption data comprises collecting current consumption data in real time.

Statement 7: A method according to any of Statements 1 through 6, wherein the current signature of the motor comprises time-based current consumption data reflecting current consumed while increasing a pressure of the hydraulic system.

Statement 8: A method according to any of Statements 1 through 7, wherein the current signature of the motor comprises time-based current consumption data reflecting current consumed while sequentially increasing a pressure of the hydraulic system to at least three different pressures.

Statement 9: A method according to any of Statements 1 through 8, wherein the current signatures of the plurality of components comprise time-based current consumption data reflecting current consumed while actuating a corresponding component at a particular pressure.

Statement 10: A method according to any of Statements 1 through 9, wherein the plurality of components comprise a plurality of solenoid valves.

Statement 11: A system comprising one or more processors and at least one computer-readable storage medium having stored therein instructions which, when executed by the one or more processors, cause the system to: retrieve from memory, current signatures for a plurality of components in a hydraulic system, the current signatures indicative of a normal operating condition for each component of the plurality of components, wherein the plurality of components includes a motor configured to power a pump that is configured to pressurize the hydraulic system; monitor current consumption of the motor during operation of the motor; determine, based on a comparison of the current consumption and current signature of the motor, an abnormal operating condition of the motor; collect, based on the determination of the abnormal condition of the motor, current consumption data from the remaining components of the plurality of components; compare the collected current consumption data to the current signatures corresponding to each of the remaining components of the plurality of components; and identify, based on the comparison of the collected current data and current signatures, an abnormal operating condition for at least one of the remaining components of the plurality of components.

Statement 12: A system according to Statement 11, the at least one computer-readable storage medium storing additional instructions which, when executed by the one or more processors, cause the one or more processors to isolate a region of the hydraulic system based on the collected current consumption data, the current consumption data indicative of normal operation of the remaining components of the plurality of components; and identify a non-electric component of the hydraulic system based on the isolated region of the hydraulic system, the non-electric component identified as an abnormally operating component.

Statement 13: A system according to any of Statements 11 and 12, wherein collecting current consumption data comprises collecting current consumption data in real time.

Statement 14: A system according to any of Statements 11 through 13, wherein the current signature of the motor comprises time-based current consumption data reflecting current consumed while increasing a pressure of the hydraulic system.

Statement 15: A system according to any of Statements 11 through 14, wherein wherein the current signature of the motor comprises time-based current consumption data reflecting current consumed while sequentially increasing a pressure of the hydraulic system to at least three different pressures.

Statement 16: A system according to any of Statements 11 through 15, wherein the current signatures of the plurality of components comprise time-based current consumption data reflecting current consumed while actuating a corresponding component at a particular pressure.

Statement 17: A system according to any of Statements 11 through 16, wherein wherein the plurality of components comprise a plurality of solenoid valves.

Statement 18: A non-transitory computer-readable storage medium comprising instructions stored on the non-transitory computer-readable storage medium, the instructions, when executed by one more processors, cause the one or more processors to: retrieve from memory, current signatures for a plurality of components in a hydraulic system, the current signatures indicative of a normal operating condition for each component of the plurality of components, wherein the plurality of components includes a motor configured to power a pump that is configured to pressurize the hydraulic system; monitor current consumption of the motor during operation of the motor; determine, based on a comparison of the current consumption and current signature of the motor, an abnormal operating condition of the motor; collect, based on the determination of the abnormal condition of the motor, current consumption data from the remaining components of the plurality of components; compare the collected current consumption data to the current signatures corresponding to each of the remaining components of the plurality of components; and identify, based on the comparison of the collected current data and current signatures, an abnormal operating condition for at least one of the remaining components of the plurality of components.

Statement 19: A non-transitory computer-readable storage medium according to Statement 18, further comprising instructions stored thereon which, when executed by the one more processors, cause the one or more processors to isolate a region of the hydraulic system based on the collected current consumption data, the current consumption data indicative of normal operation of the remaining components of the plurality of components; and identify a non-electric component of the hydraulic system based on the isolated region of the hydraulic system, the non-electric component identified as an abnormally operating component.

Statement 20: A non-transitory computer-readable storage medium according to any of Statements 18 and 19, wherein the plurality of components comprise a plurality of solenoid valves.

What is claimed is:

1. A method for detecting leaks in a hydraulic system comprising:
retrieving from memory, current signatures for a plurality of components in a hydraulic system, the current signatures indicative of a normal operating condition for each component of the plurality of components, wherein the plurality of components includes a motor configured to power a pump that is configured to pressurize the hydraulic system;

monitoring current consumption of the motor during operation of the motor;

determining, based on a comparison of the current consumption and current signature of the motor, an abnormal operating condition of the motor;

collecting, based on the determination of the abnormal condition of the motor, current consumption data from the remaining components of the plurality of components;

comparing the collected current consumption data to the current signatures corresponding to each of the remaining components of the plurality of components;

identifying, based on the comparison of the collected current data and current signatures, an abnormal operating condition for at least one of the remaining components of the plurality of components; and repairing the abnormal operating condition for at least one of the remaining components of the plurality of components.

2. The method of claim 1, further comprising generating current signatures for the plurality of components in the hydraulic system.

3. The method of claim 1, further comprising isolating a region of the hydraulic system based on the collected current consumption data, the current consumption data indicative of normal operation of the remaining components of the plurality of components.

4. The method of claim 3, further comprising identifying a non-electric component of the hydraulic system based on the isolated region of the hydraulic system, the non-electric component identified as an abnormally operating component.

5. The method of claim 4, wherein the non-electric component comprises at least one of a pressure relief valve and a check valve.

6. The method of claim 1, wherein collecting current consumption data comprises collecting current consumption data in real time.

7. The method of claim 1, wherein the current signature of the motor comprises time-based current consumption data reflecting current consumed while increasing a pressure of the hydraulic system.

8. The method of claim 1, wherein the current signature of the motor comprises time-based current consumption data reflecting current consumed while sequentially increasing a pressure of the hydraulic system to at least three different pressures.

9. The method of claim 1, wherein the current signatures of the plurality of components comprise time-based current consumption data reflecting current consumed while actuating a corresponding component at a particular pressure.

10. The method of claim 1, wherein the plurality of components comprise a plurality of solenoid valves.

11. A system for detecting leaks in a hydraulic system comprising:
one or more processors; and
at least one computer-readable storage medium having stored therein instructions which, when executed by the one or more processors, cause the system to:
retrieve from memory, current signatures for a plurality of components in a hydraulic system, the current signatures indicative of a normal operating condition for each component of the plurality of components, wherein the plurality of components includes a motor configured to power a pump that is configured to pressurize the hydraulic system;

monitor current consumption of the motor during operation of the motor;

determine, based on a comparison of the current consumption and current signature of the motor, an abnormal operating condition of the motor;

collect, based on the determination of the abnormal condition of the motor, current consumption data from the remaining components of the plurality of components;

compare the collected current consumption data to the current signatures corresponding to each of the remaining components of the plurality of components;

identify, based on the comparison of the collected current data and current signatures, an abnormal operating condition for at least one of the remaining components of the plurality of components; and repair the abnormal operating condition for at least one of the remaining components of the plurality of components.

12. The system of claim 11, the at least one computer-readable storage medium storing additional instructions which, when executed by the one or more processors, cause the one or more processors to:
isolate a region of the hydraulic system based on the collected current consumption data, the current consumption data indicative of normal operation of the remaining components of the plurality of components; and
identify a non-electric component of the hydraulic system based on the isolated region of the hydraulic system, the non-electric component identified as an abnormally operating component.

13. The system of claim 11, wherein collecting current consumption data comprises collecting current consumption data in real time.

14. The system of claim 11, wherein the current signature of the motor comprises time-based current consumption data reflecting current consumed while increasing a pressure of the hydraulic system.

15. The system of claim 11, wherein the current signature of the motor comprises time-based current consumption data reflecting current consumed while sequentially increasing a pressure of the hydraulic system to at least three different pressures.

16. The system of claim 11, wherein the current signatures of the plurality of components comprise time-based current consumption data reflecting current consumed while actuating a corresponding component at a particular pressure.

17. The system of claim 11, wherein the plurality of components comprise a plurality of solenoid valves.

18. A non-transitory computer-readable storage medium comprising:
instructions stored on the non-transitory computer-readable storage medium, the instructions, when executed by one more processors, cause the one or more processors to:
retrieve from memory, current signatures for a plurality of components in a hydraulic system, the current signatures indicative of a normal operating condition for each component of the plurality of components, wherein the plurality of components includes a motor configured to power a pump that is configured to pressurize the hydraulic system;

monitor current consumption of the motor during operation of the motor;

determine, based on a comparison of the current consumption and current signature of the motor, an abnormal operating condition of the motor;

collect, based on the determination of the abnormal condition of the motor, current consumption data from the remaining components of the plurality of components;

compare the collected current consumption data to the current signatures corresponding to each of the remaining components of the plurality of components;

identify, based on the comparison of the collected current data and current signatures, an abnormal operating condition for at least one of the remaining components of the plurality of components; and repair the abnormal operating condition for at least one of the remaining components of the plurality of components.

19. The non-transitory computer-readable storage medium of claim 18, further comprising instructions stored thereon which, when executed by the one more processors, cause the one or more processors to:

isolate a region of the hydraulic system based on the collected current consumption data, the current consumption data indicative of normal operation of the remaining components of the plurality of components; and identify a non-electric component of the hydraulic system based on the isolated region of the hydraulic system, the non-electric component identified as an abnormally operating component.

20. The non-transitory computer-readable storage medium of claim 18, wherein the plurality of components comprise a plurality of solenoid valves.

* * * * *